US010787254B1

(12) United States Patent
Chen (10) Patent No.: US 10,787,254 B1
(45) Date of Patent: Sep. 29, 2020

(54) VTOL FLYING TAXICAB

(71) Applicant: Franklin Y. K. Chen, Northport, NY (US)

(72) Inventor: Franklin Y. K. Chen, Northport, NY (US)

( * ) Notice: Subject to any disclaimer, the term of this patent is extended or adjusted under 35 U.S.C. 154(b) by 383 days.

(21) Appl. No.: 15/790,237

(22) Filed: Oct. 23, 2017

Related U.S. Application Data

(60) Provisional application No. 62/410,915, filed on Oct. 21, 2016.

(51) Int. Cl.
 B64C 29/00 (2006.01)
 B64D 35/02 (2006.01)
 B64C 9/26 (2006.01)

(52) U.S. Cl.
 CPC ............ B64C 29/0033 (2013.01); B64C 9/26 (2013.01); B64D 35/02 (2013.01)

(58) Field of Classification Search
 CPC ..... B64C 17/00; B64C 29/00; B64C 29/0033; B64C 29/0016; B64C 11/00; B64C 11/001; B64C 9/00; B64C 21/00; B64C 9/20; B64C 9/146; B64C 9/28; B64C 9/34; B64C 9/36; B64C 23/06; B64C 9/26; B64D 27/06; B64D 27/14; B64D 27/20; B64D 35/02; B64B 1/38
 See application file for complete search history.

(56) References Cited

U.S. PATENT DOCUMENTS

| 2,261,363 | A | * | 11/1941 | Griswold | ................ B64C 9/146 244/90 A |
| 2,478,847 | A | * | 8/1949 | Stuart | ................. B64C 29/0033 244/7 R |
| 3,055,618 | A | * | 9/1962 | Brislawn, Jr. | ......... B64C 11/001 244/87 |
| 3,088,694 | A | * | 5/1963 | Stirgwolt | ............ B64C 29/0016 244/12.3 |
| 3,088,695 | A | * | 5/1963 | Clark | .................. B64C 29/0016 244/12.3 |

(Continued)

FOREIGN PATENT DOCUMENTS

FR 1406674 A * 7/1965 ......... B64C 29/0033

OTHER PUBLICATIONS

Darpa, "VTOL X-Plane Phase 2 Concept Video", https://www.youtube.com/watch?v=3b_YQgfa7OA, Pub. Mar. 3, 2016, YouTube, Screenshots PDF with annotations attached. (Year: 2016).*

*Primary Examiner* — Magdalena Topolski
(74) *Attorney, Agent, or Firm* — Edwin D. Schindler (57) ABSTRACT

A VTOL flying taxicab is provided to solve the ground and airport traffic congestion problems by directing the traffic from two-dimensional ground space to the three-dimensional air space. The VTOL-Flying-Taxicab includes two rows of independently controllable small electrical-motor driven propellers, located above-and-below each of its two wings' leading edges. This configuration divides each wing-top-surface and wing-bottom-surface into independently controllable strips of wing surfaces, where the thrust vector, air velocity vector and air pressure on each and all strips of wing surfaces are independently controllable at any vehicle speed. These features provide all control requirements of the VTOL-flying-taxicab maneuvers.

3 Claims, 12 Drawing Sheets

(56) References Cited

U.S. PATENT DOCUMENTS

| | | | | |
|---|---|---|---|---|
| 3,110,456 | A * | 11/1963 | Creasey | B64C 29/0016 244/12.3 |
| 3,335,977 | A * | 8/1967 | Meditz | B64C 3/42 244/12.4 |
| 3,744,745 | A * | 7/1973 | Kerker | B64C 7/02 244/199.1 |
| 4,165,849 | A * | 8/1979 | Fox | B64C 9/32 244/113 |
| 4,452,411 | A * | 6/1984 | Eickmann | B64C 29/00 244/12.4 |
| 4,566,657 | A * | 1/1986 | Grow | B64C 9/20 244/113 |
| 4,696,442 | A * | 9/1987 | Mazzitelli | B64C 23/06 244/200.1 |
| 4,848,701 | A * | 7/1989 | Belloso | B64C 9/146 244/12.5 |
| 5,020,740 | A * | 6/1991 | Thomas | B64C 17/00 244/203 |
| 5,772,155 | A * | 6/1998 | Nowak | B64C 5/08 244/200.1 |
| 6,655,632 | B1 * | 12/2003 | Gupta | B64C 23/06 244/1 N |
| 9,187,175 | B1 * | 11/2015 | Chen | B64D 1/22 |
| 9,550,561 | B1 * | 1/2017 | Beckman | B64C 17/00 |
| 10,293,914 | B2 * | 5/2019 | Wiegand | B64C 1/0009 |
| 2002/0109043 | A1 * | 8/2002 | Li | B64C 39/001 244/12.2 |
| 2004/0129838 | A1 * | 7/2004 | Lisy | B64C 3/58 244/204.1 |
| 2006/0113425 | A1 * | 6/2006 | Rader | B64C 15/00 244/17.11 |
| 2006/0202081 | A1 * | 9/2006 | Milde, Jr. | B64C 3/56 244/12.1 |
| 2011/0315806 | A1 * | 12/2011 | Piasecki | B64C 27/32 244/2 |
| 2012/0104161 | A1 * | 5/2012 | Shah | B64D 27/18 244/52 |
| 2012/0111994 | A1 * | 5/2012 | Kummer | B63G 8/18 244/15 |
| 2013/0020432 | A1 * | 1/2013 | Yogev | B64C 9/12 244/51 |
| 2013/0140404 | A1 * | 6/2013 | Parks | B64C 29/0091 244/23 A |
| 2017/0190440 | A1 * | 7/2017 | McLaughlin | B64C 9/36 |
| 2018/0044012 | A1 * | 2/2018 | Groninga | B64C 29/0033 |
| 2018/0086448 | A1 * | 3/2018 | Kroo | B64C 29/0033 |
| 2018/0229837 | A1 * | 8/2018 | Kimchi | B64C 27/52 |

* cited by examiner

VTOL FLYING TAXICAB

CROSS-REFERENCE TO RELATED APPLICATION

The inventor claims domestic priority, pursuant to 35 U.S.C. § 119(e), on the basis of U.S. Provisional Patent Application No. 62/410,915, filed Oct. 21, 2016, the entire disclosure of which shall be deemed to be incorporated by reference herein.

BACKGROUND OF THE INVENTION

Field of the Invention

The present invention relates generally to aircraft and, more specifically, to an aircraft having independently controlled multiple rows of electric-motors-powered-ducked-propellers located above-and-below each wing's leading edge with controlled air flow around a station-wing or a moving-wing having independent control of air flow on any narrow wing sections above and below a wing and subdivided wing-flaps into independently controllable subsections with wing leading-edge control surfaces, wing-tilt control disk pairs, VTOL aircraft flight and maneuver controls, independently controllable feather-like wing surfaces and best hover stability and control configuration.

Description of the Prior Art

There are other VTOL aircraft in the prior art. While these aircraft may be suitable for the purposes for which they where designed, they would not be as suitable for the purposes of the present invention as heretofore described.

It is thus desirable to provide a VTOL aircraft that can load/unload its payload horizontally while hovering at a fixed position in space.

SUMMARY OF THE PRESENT INVENTION

Unique features of this invention are summarized in the following 16 key paragraphs:

Another object of the VTOL-Flying-Taxicab is to provide two rows of independently-controllable small ducted-propellers, powered by electric motors on each wing.

Yet another object of the VTOL-Flying-Taxicab is to provide one row of small ducted-propellers located near each wing's leading edge top area.

Still yet another object of the VTOL-Flying-Taxicab is to provide one row of small ducted-propellers located near each wing's leading edge bottom area.

An additional object of the VTOL-Flying-Taxicab is to provide each wing-flap subdivided into multiple independently controllable wing-flap sections.

A further object of the VTOL-Flying-Taxicab is to provide wing leading-edge controllable surfaces.

A yet further object of the VTOL-Flying-Taxicab is to provide electric-battery packages located on both sides of both wing to balance the ducted-propellers weight with other electric-battery packages located in the fuselage belly.

A still yet further object of the VTOL-Flying-Taxicab is to provide wings that can independently tilt from (or close to) their local-horizontal position to (or close to) their local-vertical positions;

Another object of the VTOL-Flying-Taxicab is to provide a long shaft connecting each wing's left-side to the wing's right-side wherein both-sides of a wing either lock-together or tilt-together by this shaft relative to the fuselage structure;

Yet another object of the VTOL-Flying-Taxicab is to provide each wing two pairs of braking-disks located on opposite sides of the VTOL-Flying-Taxicab fuselage walls or vertical tail walls;

Yet another object of the VTOL-Flying-Taxicab is to provide each pair of braking-disk: one called fuselage-fixed-disk, is fixed on the fuselage structure but free from the long-shaft rotation with the other disk and the other called wing-fixed-disk, fixed on each-side of the wing closest to the fuselage with the wing-fixed-disk also fixed on the long-shaft.

Still yet another object of the VTOL-Flying-Taxicab is to provide each wing free to tilt, when both pairs of its braking-disks' wing-fixed-disks are free to rotate relative to its respective fuselage-fixed-disks simultaneously. A wing will be locked at a fixed tilt angle on the fuselage, when both of its wing-fixed-disks are locked onto their corresponding fuselage-fixed-disks simultaneously.

Solenoids, or other means, are used to make pulsating push simultaneously on multiple braking-blocks located on the circumferences of both pairs' fuselage-fixed-disks to make pulsating contact with their corresponding wing-fixed-disks. This allows the opportunity to change the wing tilt angle by aerodynamic forces acting on the wing with or without assistance from hydraulic or electrical devices or wing weight shafting;

When a desired wing tilt angle is achieved, solenoids on both pairs of braking-disks' fuselage-fixed-disks will continuously push all their braking-blocks on their respective wing-fixed-disks. Therefore, simultaneously locking the wing to the fuselage;

Additional wing tilt locking pins are used to lock the wings to the fuselage and to vertical tail for longer duration flights.

VTOL Flying-Taxicab basic control options are:

a) The thrust vector magnitude generated by the ducted—propellers' thrusts are controlled by independently selection of controllable propeller RPMs on any numbers of propellers above and/or below each or all wing sections surfaces.

b) Each wing flap is subdivided into multiple independently controllable tilt subsections. By controlling the air velocities differences above-and-below any section of the wing, controls the air pressures differences above and below that section of the wing. This creates a lift force vector perpendicular to that section of the wing pointing either up or down.

c) On a locked wing, each lift vector produces a torque which is used to produce vehicle roll and pitch. Vehicle yaw is controlled by thrust differences on left and right sides of the wing;

d) On an unlocked wing, each lift vector can be used to tilt the wing to its desired tilt angle.

e) The magnitude of each propeller's thrust vector is by designed of electric motor, design of propeller characteristics, design of propeller duct, and operating rpm.

f) Controllable small surfaces, called feathers are placed on selected wing surface areas. These feathers can be commanded to deflect air flow above the wing surfaces altering the aerodynamic vectors on the wing.

g) While the use of feathers may eliminate wing-flaps on some VTOL-Flying-Taxicab models, feathers may be eliminated on some model to use only independently controllable multiple sections of wing flaps instead.

h) Special feathers may be placed on each ducted-propeller's air-exit circumferences, to continuously and adoptively modify each thrust vector's direction in such a way that all thrust vectors from both wing will intercept inside a small sphere very high above this VTOL-Flying-Taxicab's center-of-gravity point during hover.

i) All propeller-thrust-vectors and the controllable aerodynamic-force-vectors acting on the VTOL-Flying-Taxicab at any time depending on the on-board computer and the pilot commands to react to weather, traffic, regulations and mission requirements.

j) Differential control changes between the front and back wings and between the left-side and right-side of both front and back wings controls the VTOL-Flying-Taxicab pitch, roll and yaw flight maneuvers.

These unique features described above should be followed by further evaluations to examine the VTOL-Flying-Taxicab performance parameters against its subsystems' weights, reliabilities and costs. Also required are wind-tunnel tests, 3-D computational fluid dynamics (CFD) analysis and flight tests.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the batting practice device of the present invention. With regard to the reference numerals used, the following numbering is used throughout the various drawing figures.

$\beta$ tilt rotation angle range of wing $1w$
$\beta'$ tilt rotation angle range of wing $1w$
$1a$ front wing-top surface ducted propellers
$1a'$ two rows ducted-propellers above leading edge rear-wing and top surface of $1w'$
$1ai$ the ith ducted propeller of $1a$
$1ai'$ ducted propellers of rear-wing
$1b$ front wing-bottom surface ducted propellers
$1bi$ two rows ducted-propellers below leading edge rear-wing and bottom surface of $1w'$
$1bi'$ the ith ducted propeller of $1b$
$1bj$ jth ducted-propeller of ducted row propellers $1b'$
$1f$ fuselage
$1h$ local horizontal flight direction of $10$
$1i$ instrument panel
$1m$ brake disk of $1mn$ fixed to fuselage structure but not fixed to shaft $1s$ fuselage-fixed-disk
$1mn$ front wings braking disks
$1mn'$ rear wings braking disks
$1n$ brake disk of $1mn$ fixed to fuselage structure and fixed to shaft $1s$ wing-fixed-disk
$1p$ pilot seat
$1p'$ passenger's seats
$1r$ ground parking wheel positions
$1s$ center line tube connecting left side and right side of $1w$
$1s'$ center line tube connecting left side and right side of $1w'$
$1v$ local vertical direction of $10$
$1v+$ slight backward tilt of forward wing $1w$ from vertical $1v$
$1v'$ slight backward tilt of forward wing $1w$
$1w$ front-wings left and right
$1w'$ rear-wing left and right
$1x$ leading edge of $1w$
$1x'$ rear wing leading edge
$2e$ multiple independent front flaps covering ducted propeller frontal area independently controlled to tilt slightly
$2f$ multiple independent wing flaps
$21i$ lift vector
$21j$ lift vector in jth wing section
$2mi$ electric motors
$2pi$ propellers
$2ti$ sum of thrust vectors produced by ducted-propellers $2ai$ above and $2bi$ below wing $1w$
$2v0$ air velocity in front of wing $1w$ ith section
$2v1$ air velocity vector after $1ai$ on wing $1w$ top surface
$2v1i$ cumulative air velocity wing-top surface
$2v2$ air velocity vector after $1bi$ on wing $1w$ bottom surface
$2v2i$ cumulative air velocity wing-bottom surface
$2v3$ air velocity vector on top side of wing flap
$2v4$ air velocity vector on bottom side of wing flap
$2zj$ lift vector in jth wing section
$3n$ wing-fixed-disks 3x braking blocks of fuselage-fixed-disk 1m
3y solenoid mechanisms engaging and disengaging contact with wing-fixed-disk 1n
4a1 feathers
4a2 feathers
4b wing rechargeable battery package
d(4b) shift of 4b
4b' wing rechargeable battery package
4f1 controllable small rectangular surfaces (feathers) on top surface of the first wing
4f1' controllable small rectangular surfaces (feathers) on top surface of the second wing
4f2 controllable small rectangular surfaces (feathers) on bottom surface of wing 1w
4f2' controllable small rectangular surfaces (feathers) on bottom surface of wing 1w'
5i ideal center of the ideal small sphere
5s small sphere
5ta' line extension of all thrust vectors from all ducted propellers in row 1a'
5ta line extension of all thrust vectors from all ducted propellers in row 1a
5tb line extension of all thrust vectors from all ducted propellers in row 1b
5tb' line extension of all thrust vectors from all ducted propellers in row 1b'
6b high rise bldg
6w window opening
6y support structure
6v pathway for rescued people to move from the building to the VTOL-rescue-Craft

DETAILED DESCRIPTION OF THE PREFERRED EMBODIMENT

This discussion should not be construed as limiting the invention to those particular embodiments, practitioners skilled in the art will recognize numerous other embodiments as well. For definition of the complete scope of the invention, the reader is directed to appended claims.

Figure 1A:
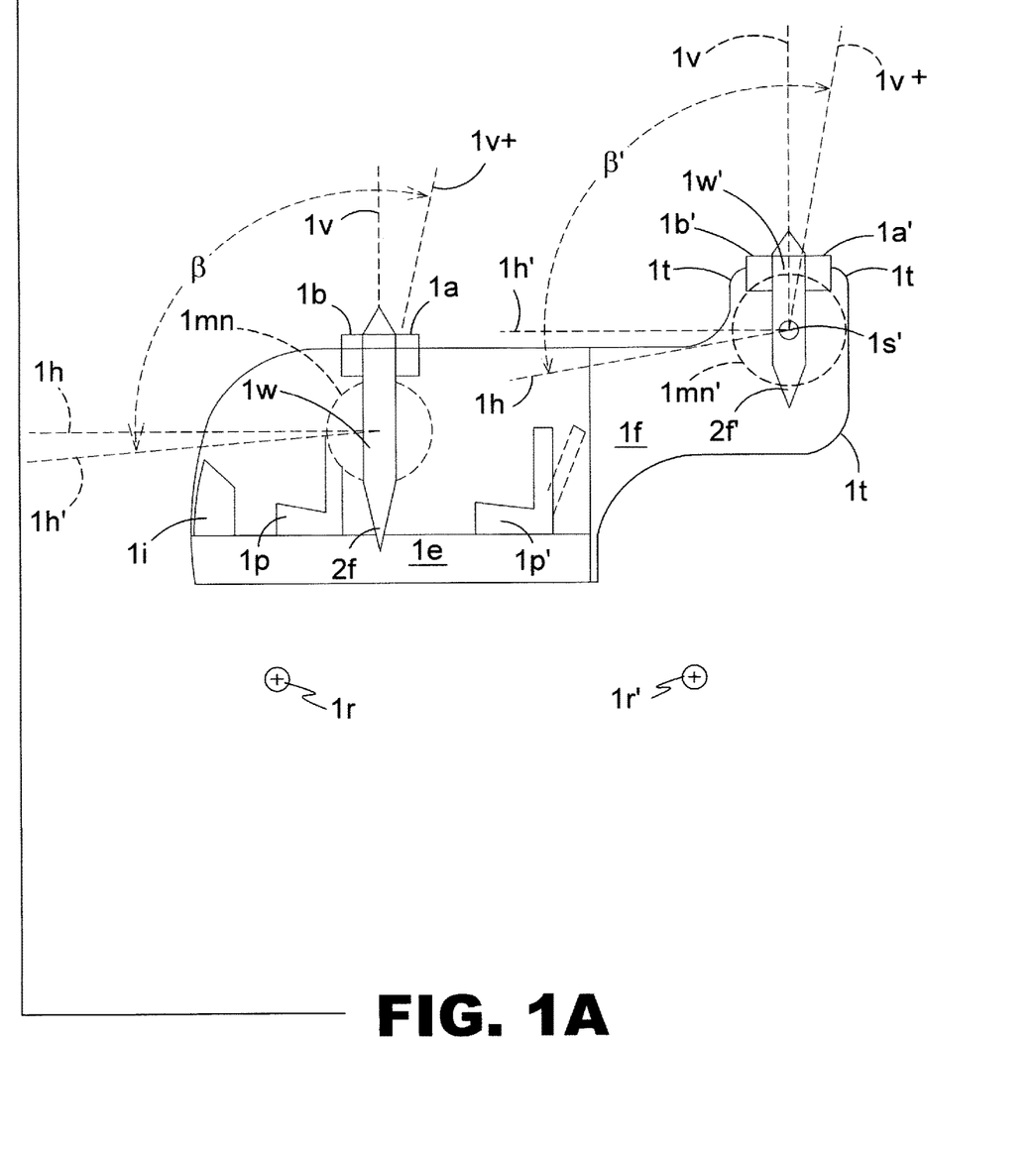
FIG. 1A is a side view of the VTOL Flying Taxicab with both wings in a vertical position.
Figure 1B:
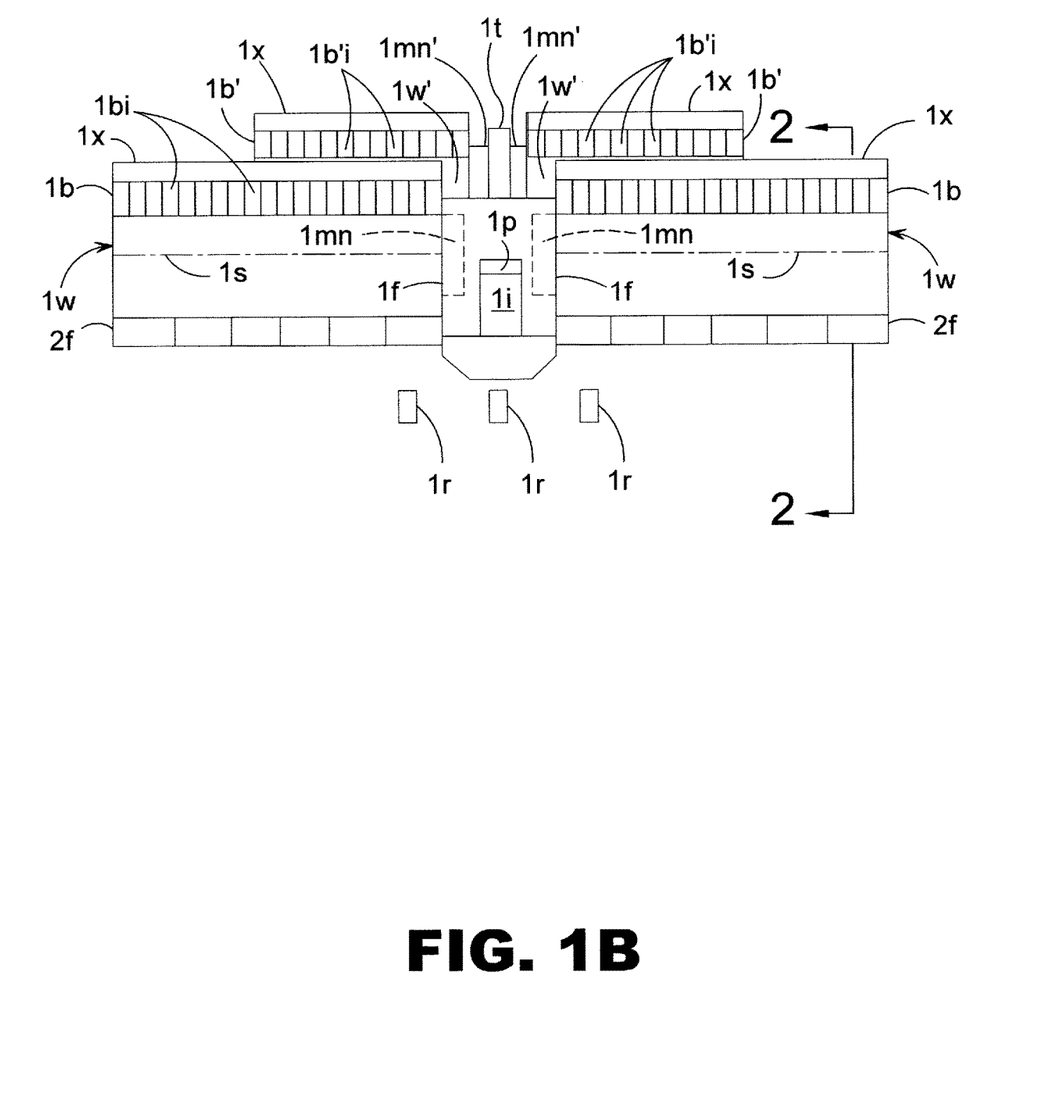
FIG. 1B is a front view of the VTOL Flying Taxicab with both wings in a vertical position.
Figure 1C:
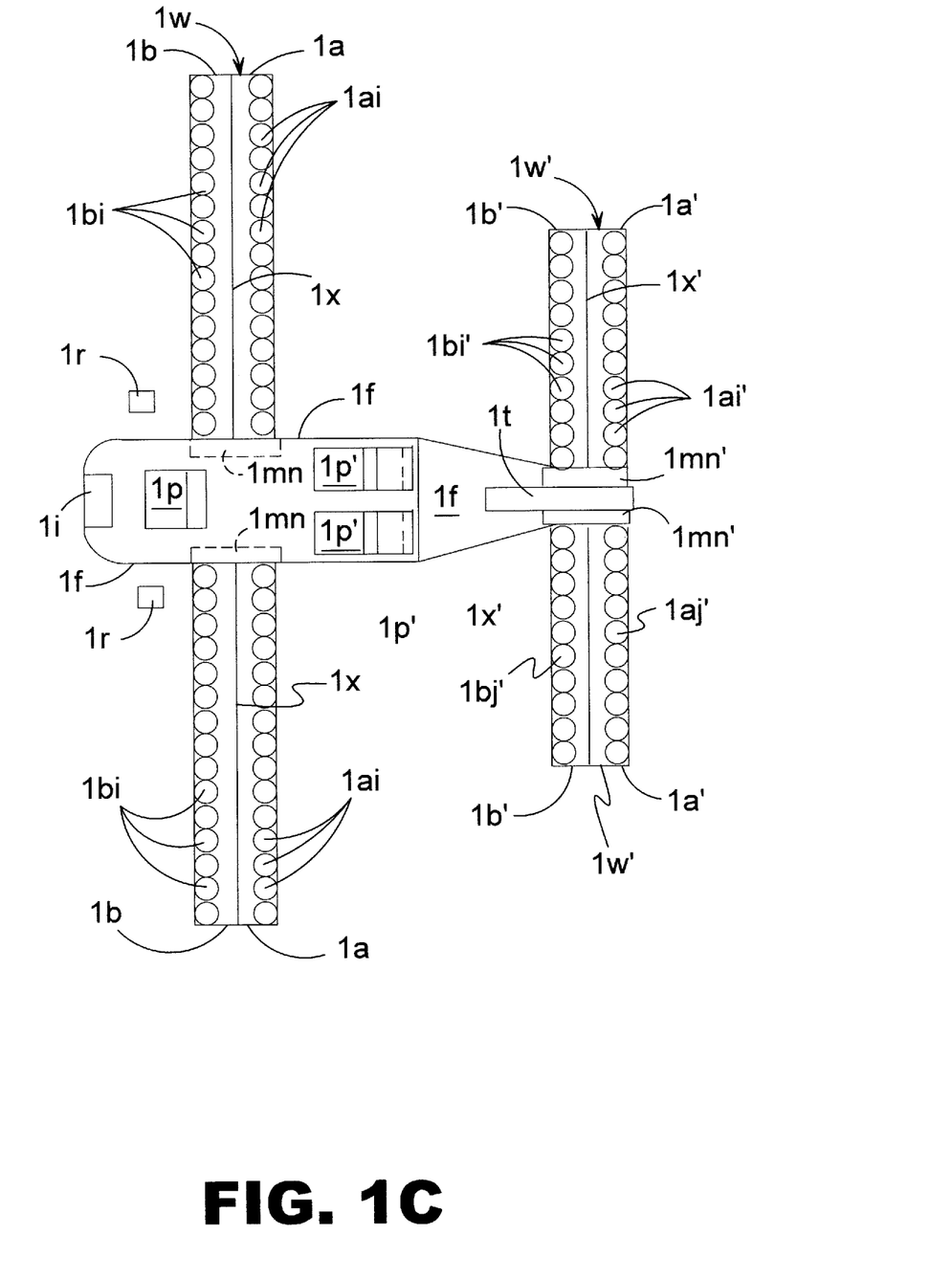
FIG. 1C is a top view of the VTOL Flying Taxicab with both wings in a vertical position.

A more complete appreciation of the present disclosure and many of the attendant advantages thereof will be readily obtained as the same becomes better understood by reference to the following detailed description when considered in connection with the accompanying drawings, wherein:

NOTE: In the following descriptions, different views of a same item are labeled by the same figure number followed by a different capital letter. For example: three views of FIG. 1 are identified as: FIG. 1A, FIG. 1B and FIG. 1C. Furthermore, each important item in each figure is identified by a bold face figure number followed by a lower case bold face letter: The bold face number corresponding to the figure number where each item is described. For example, item labeled 1a in FIG. 1A identifies the row of electric-motor-driven-ducted-propellers shown as rows of small rectangles on wing leading edge top area. The item in FIG. 1C labeled tai in FIG. 1C identifies the ith electric-motor-driven-ducted-propeller in wing leading edge top row of electric-motor-propellers 1a shown as a small circle.

FIGS. 1A through 1C shows the VTOL-Flying-Taxicab with both of its wings, 1w and 1w', tilted at or close-to local vertical positions during hover, vertical-ascent or vertical-descent flights. FIG. 1A is the side-view. FIG. 1B is the front-view and FIG. 1C is the top-view.

Each independently operated ducted-propeller (on wing-bottom surface, below wing leading edge 1x) is shown either as a row of small rectangles 1b in FIG. 1B or as a row of small circles 1b in FIG. 1C. Each ducted-propeller contains an electric motor and a propeller, both are covered by a short tube with inner spiral-fins to re-direct some high rotational air flow to linear air flow direction toward the wing flap. These spiral-fins are not shown in FIG. 1A-1C to avoid clutters.

The left and right sides of the front-wings 1w are attached to the left and right sides of the fuselage 1f via a pair of braking disks identified as 1mn. The left and right sides of the rear-wing 1w' are attached to the left and right sides of the vertical tail 1t via a pair of braking disks labeled as 1mn'.

Two rows of independently operated ducted-propellers are labeled as 1a (on front wing 1w top surface, above wing leading-edge 1x) and 1b (on 1w wing-bottom surface, below wing leading-edge 1x). Rows of ducted-propellers 1a are fixed, above both-sides of the forward wing 1w leading edges. Item labeled 1ai is the ith ducted-propeller in row 1a of ducted-propellers, where i=1, 2 ... k. Row 1b on wing leading-edge bottom surface and each ducted-propeller is identified as 1bi, where i=1, 2 ..., k.

Two rows of independently operated ducted-propellers labeled as 1b are located on the left and right sides of wing 1w bottom surfaces and below 1w leading edges 1x. Two rows of independently operated ducted-propellers labeled as 1a' are fixed above the rear-wing 1w' leading edge 1x' and on the 1w' top surface. Two rows of independently operated ducted-propellers labeled 1b' are located below the rear-wing 1w' leading edge 1x' and on 1w' bottom surface. Item identified as 1bj' identified the jth ducted-propeller in the row of ducted propellers 1b', where j=1, 2 ... q. Item identified as is represents the center line of the tube connecting the left-side and right-side of the front wing 1w, it is about this tube the wing 1w tilts from horizontal level flight to vertical hover flight. Rechargeable batteries will be located between the shaft 1s and the entire flaps 2f to balance the weight of two rows of ducted-propellers. The center line of the long tube connecting the left-side to the right-side of the rear wing 1w' is identified and labeled as 1s'.

Items labeled as β and β' are wing 1w and wing 1w' tilt rotation angles ranges respectively. Items labeled 1v and 1h are the local vertical and local horizontal directions respectively of the VTOL-Flying-Taxicab. Item labeled 1v+ represents a slight backward-tilt of the forward wing 1w from local vertical 1v. This is identified, because for best stable hover flight: if the thrust vectors from all rows of ducted-propellers 1a, 1b, and 1a', 1b' intercept inside a small sphere, with the small sphere center at an ideal point high above the VTOL-Flying-Taxicab center of gravity point (see FIG. 5). To ensure this ideal point, will require installing each ducted-propellers, 1ai, 1bi, 1ai' and 1bi', center lines tilted slightly. This will, ideally, make all thrust vectors from both wings to intercept inside the small sphere high above (or in-front of) the VTOL-Flying-Taxicab's center of gravity point to achieve best stable hover (or forward) flights. This small sphere accounts for wing load deflections, wing vibrations, wind gusts, etc. 'Item labeled 1t is the vertical tail, which is attached to the VTOL-Flying-Taxicab structure frame 1f.

A pair of braking-disks connecting both-sides of front wing 1w and the fuselage walls are identified as 1mm. A pair of braking-disks connecting both-sides of rear wing 1w' and the vertical tail 1t are identified as 1mn'. Label 1p identifies the pilot's seat. 1p' are the passengers' seats. Note for pilotless VTOL-Flying-Taxicabs two more seats can be added at 1p location. This will increase the passengers seating capacity of FIG. 1A-1C configuration from 2 to 4 or 5.

1$i$ is the instrument panel, which can include sensors subsystems hardware and software required for future pilotless VTOL-Flying-Taxicabs. 1$r$ are the ground parking wheel positions. In FIG. 1B the two arrows labeled (see FIG. 2) identifies the cut-away section of a typical VTOL-Flying-Taxicab's wing-section as illustrated in detail in FIG. 2A-2B.

Figure 2A:
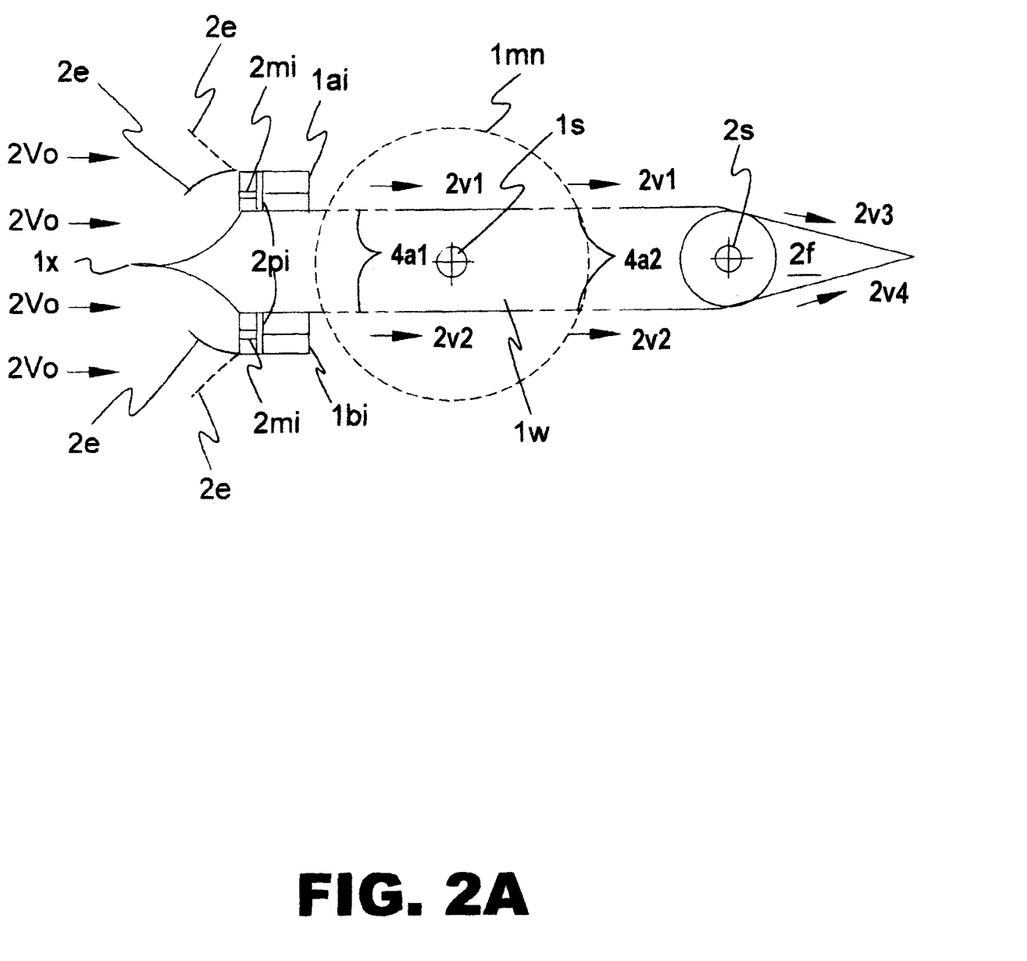
FIG. 2A illustrates the air flow over the wing section.
Figure 2B:
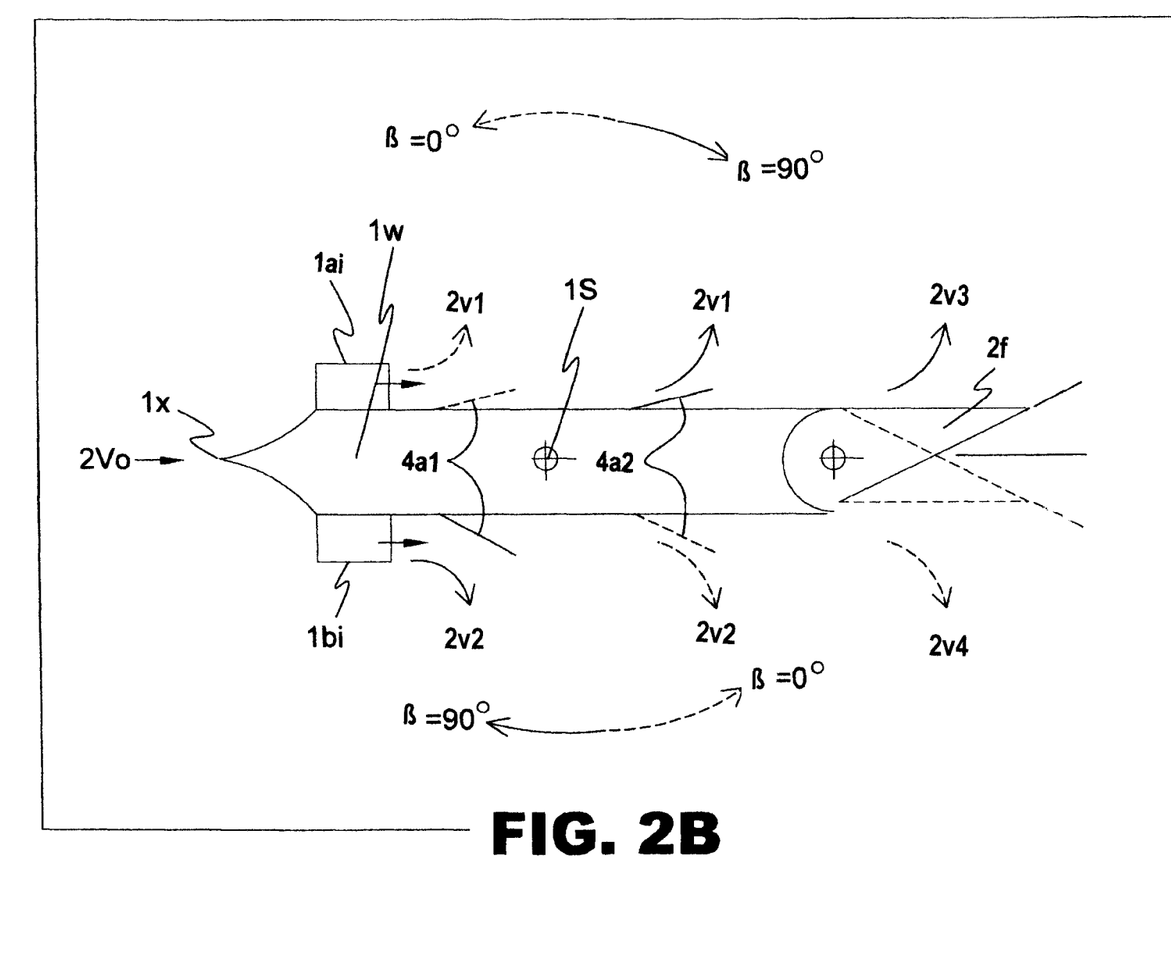
FIG. 2B illustrates the use of flap section and feathers to produce torque.
Figure 2C:
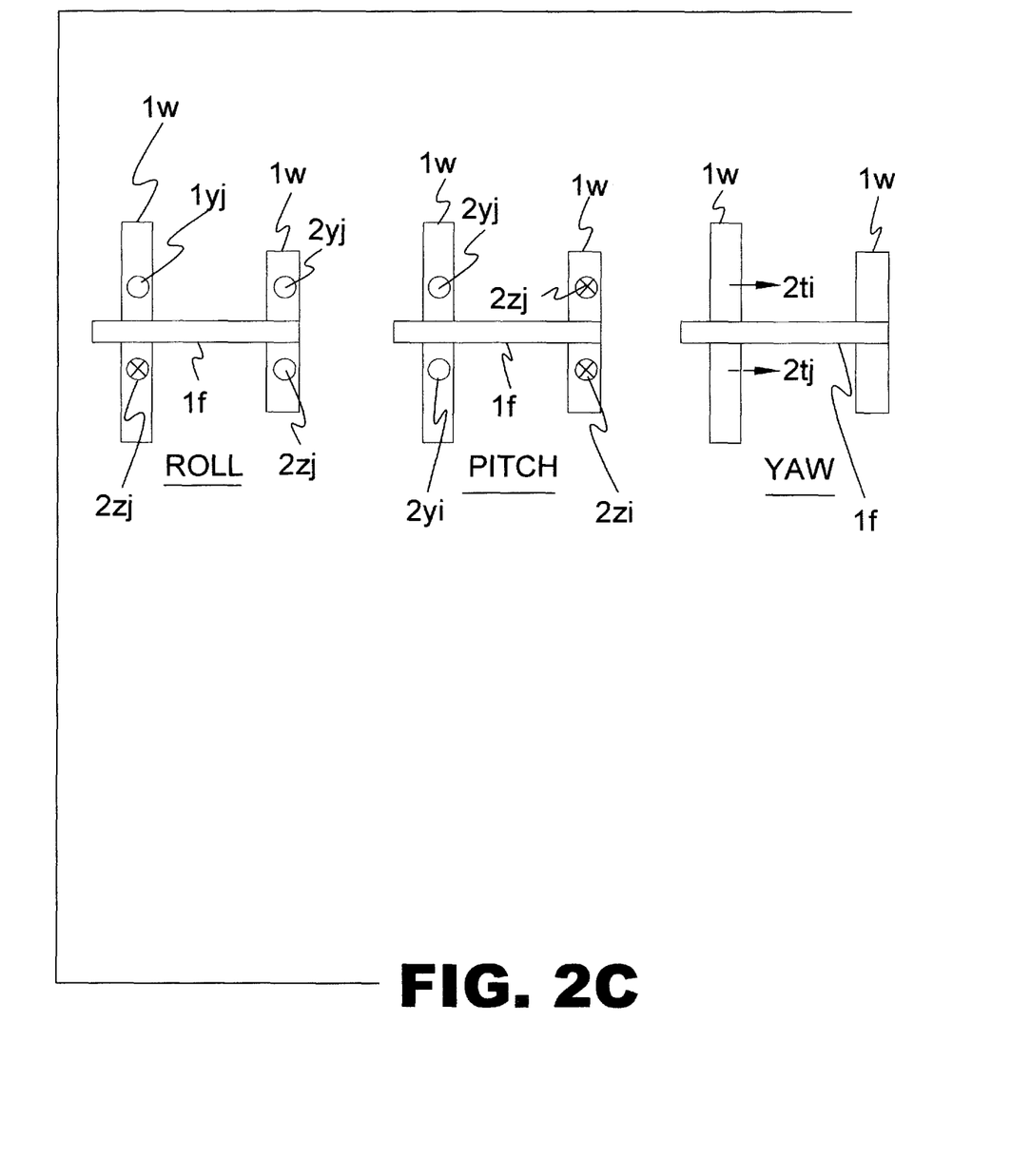
FIG. 2C illustrates wing section contribute to Taxicab's roll pitch and yaw controls.

FIGS. 2A through 2C illustrates the air flow over the wing section, the use of flap section and feathers to produce torque and wing section contribute to Taxicab's roll pitch and yaw controls. Shown is a section view of a typical VTOL-Fling-Taxicab wing cut-away-section as identified by two arrows and labeled (see FIG. 2) in FIG. 1B. FIG. 2A illustrates the air flow over the wing section. FIG. 2B illustrates the use of a flap section 2$f$, in combination of feathers 4$a$1 and 4$a$2, to produce CW or CCW torque about shaft 1$s$. FIG. 2C illustrates that each section of each wing can independently contribute VTOL-Flying-Taxicab's roll, pitch and yaw controls.

The typical ith ducted-propellers, shown as small circles in FIG. 1C and labeled as 1$ai$ and 1$bi$ are enlarged in FIG. 2A to illustrate the electric motor 2$mi$ which drives the propeller 2$pi$ inside the ith ducts 1$ai$ and 1$bi$ near 1$w$ leading edge 1$x$.

Items identified as 2$e$ are each a strip of surfaces, covering each row of ducted-propellers' frontal areas. Each 2$e$ can be independently controlled to tilt slightly as shown by dashed lines 2$e$ in FIG. 2A. Note, some surfaces 2$e$ can also be made as an extension of 1$x$. Most importantly, this independently controllable surface 2$e$ can be used as wing's front-flaps control surface to assist wing tilt control as discussed in FIG. 2B below. 2$v$0 is the air velocity in front the wing 1$w$ ith section. 2$v$1 is the air velocity vector after 1$ai$ on 1$w$ top surface. 2$v$2 is the air velocity vector after 1$bi$ on 1$w$ bottom surface. 2$v$3 and 2$v$4 are velocity vectors on top and bottom sides of the wing-flap. Their directions are depending on each flap section deflection angles.

It is important to note that depending on power inputs differences to each electric motor 2$mi$ in 1$ai$ and 1$bi$, will cause their corresponding propellers 2$pi$ to rotate at different RPMs. This will create a pressure difference across that wing's ith section. Therefore, creating a lift vector 2$li$ pointing either up or down depending if 2$v$1>2$v$2 or 2$v$1<2$v$2. This feature is used to control this VTOL-Flying-Taxicab's pitch and row maneuvers. By making all 1$a$ row of ducted-propellers rotating at higher RPMs than all 1$b$ row of ducted-propellers' RPMs, this will make the entire wing-top velocity higher than the entire wing-bottom velocity, 2$v$1$i$>>2$v$2$i$ for all i=1, 2 . . . k. A large upward pointing lift force will developed to allow the VTOL-Flying-Taxicab to take-off or land on very short runways without tilting its wings to vertical positions.

FIG. 2B illustrates the used of flap 2$f$, feathers 4$a$1-4$a$2, eye-lip 2$e$ and wing-battery-package 4$b$ shift d(4$b$) to control wing tilt angle β. Each wing section can make small contribution to change the wing tilt angle β as needed by the mission: surfaces 4$a$1, 4$a$2, 2$e$ and 2$f$ in each wing section can deflect in combination with shifting a selected wing-battery package 4$b$ position change, (4$b$). These actions change the air flow directions 2$v$1, 2$v$2, 2$v$3 and reduce the torques required to tilt the wing about is axis.

Wing leading edge 1$x$ can be enlarged to independently controllable surfaces to assist the wing tilt requirement.

FIG. 2C illustrate the lift force vector on each wing section produced by the velocities difference on wing-top 2$v$1 and on wing-bottom 2$v$2. A dot in a circle, labeled 2$yj$, represents the lift vector 2$lj$ generated in the jth wing section pointing-out-off the page. A×inside a circle, labeled 2$zj$, represents the lift vector 2$lj$ generated in the jth wing section pointing-into of the page. These force vectors produce torques causing the VTOL-Flying-Taxicab to roll and pitch. 2$ti$ is the sum of thrust vectors produced by the ith ducted-propellers 2$ai$ and 2$bi$ above and below the ith sections of wing 1$w$ surfaces respectively. The difference between the left-wing and right-wing 2$ti$ vectors controls the vehicle yaw.

Figure 3A:
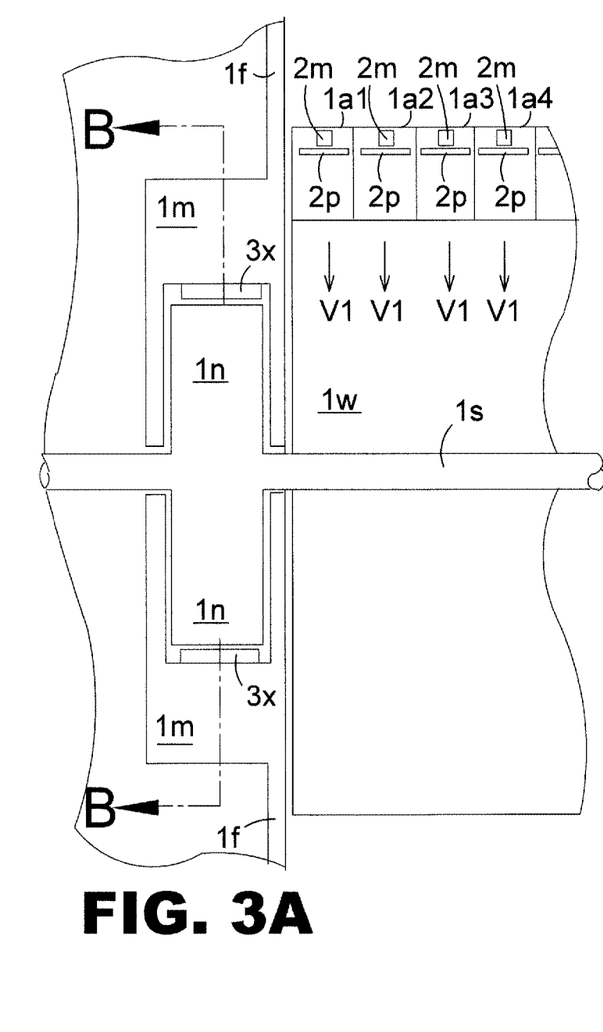
FIG. 3A is a top of one of the braking discs connecting fuselage with wing.
Figure 3B:
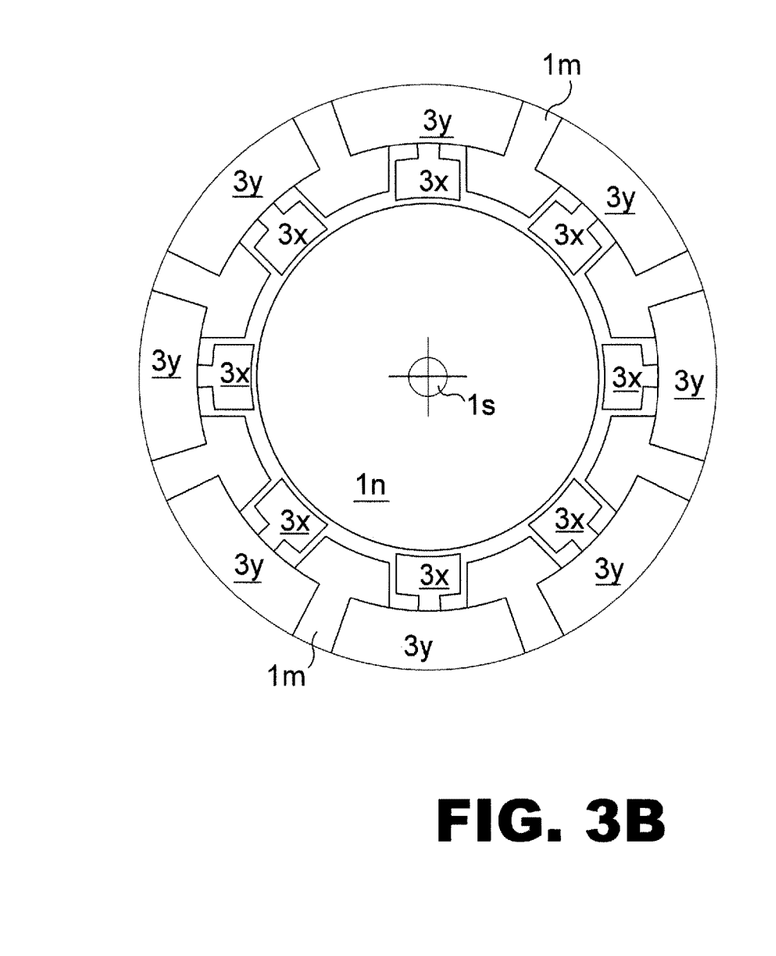
FIG. 3B is a sectional view taken from FIG. 3A as indicated, illustrating location of braking blocks and their controlling solenoids.

FIGS. 3A and 3B are illustrations one of the two large pairs of braking-disk 1$mn$. FIG. 3A is a top view the two disks 1$m$ and in of disk 1$mn$: where disk 1$m$ connecting one side of a fuselage 1$f$ wall and disk in connecting to one side of the wing 1$w$. FIG. 3B is the section B-B, identified in FIG. 3A, illustrating the locations of braking blocks 3$x$ and their controlling solenoids 3$y$ on the inner circumference of braking disk 1$m$. Each pair of braking-disk is identified as 1$mn$ for wing 1$w$ and 1$mn$' for wing 1$w$'. The disk fixed to the fuselage structure but not fixed to the shaft 1$s$ is called fuselage-fixed-disk and labeled 1$m$. The disk fixed to the wing structure and also fixed to the shaft 1$s$ is called wing-fixed-disk and labeled 1$n$. 3$x$ are braking-blocks, which are evenly distributed along the inside circumference of the fuselage-fixed-disk 1$m$. These 3$x$ are simultaneously controlled by their solenoid mechanisms 3$y$, to make-or-not-make contact with the wing-fixed-disk 1$n$.

During constant flight condition, where the wing is locked on the fuselage, all 3$y$ are pushing their respective 3$x$ firmly on the wing-fixed-disks 3$n$. Some additional locking mechanism (not shown) will be applied to lock the wing during long flight operations.

When mission requires change of wing tilt angle β, all 3$y$ will be issued a pulsing mode commands to pulsing all their 3$x$ blocks in-and-out in contact with their respective wing-fixed-disks at varying strengths and frequencies. This allows the aerodynamic forces, assisted by either hydraulics or electrical-mechanical devices (not shown), to change the wing tilt angle β to its latest required position.

Figure 4A:
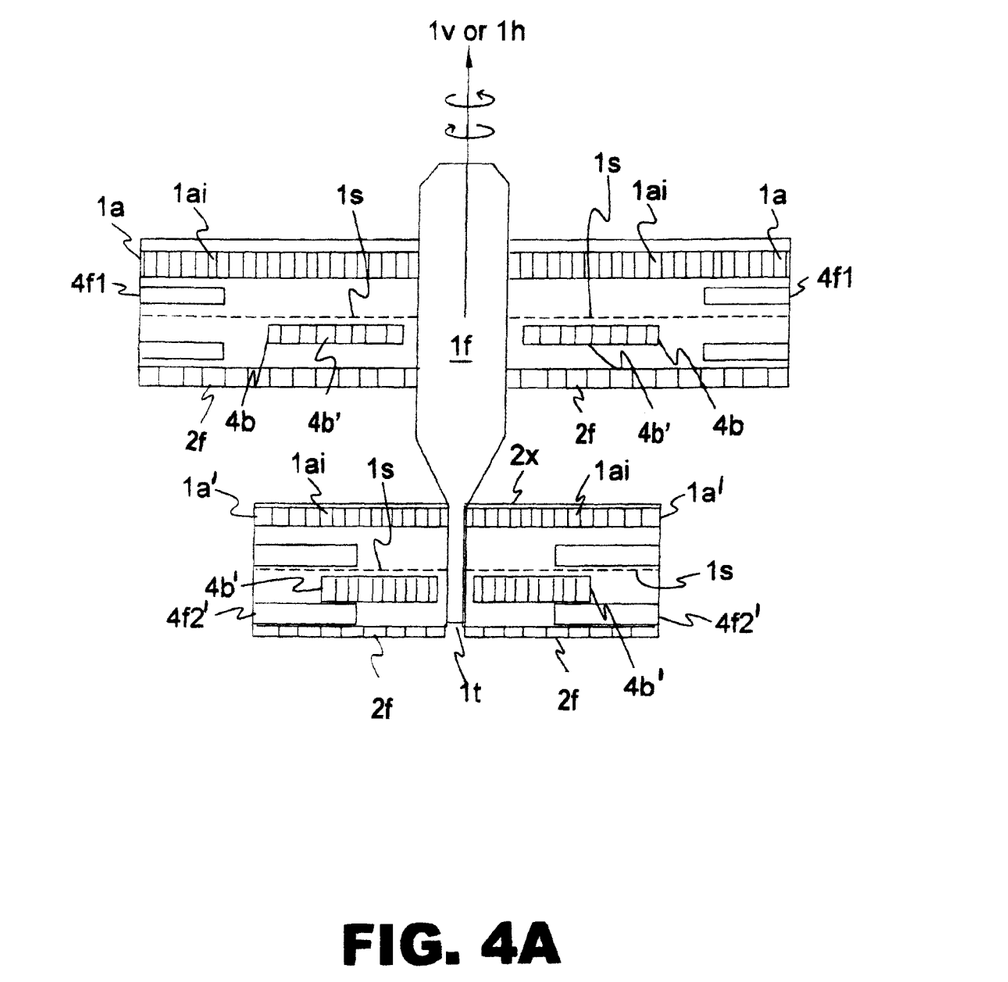
FIG. 4A is a top view of Taxicab with both wings in level flight.
Figure 4B:
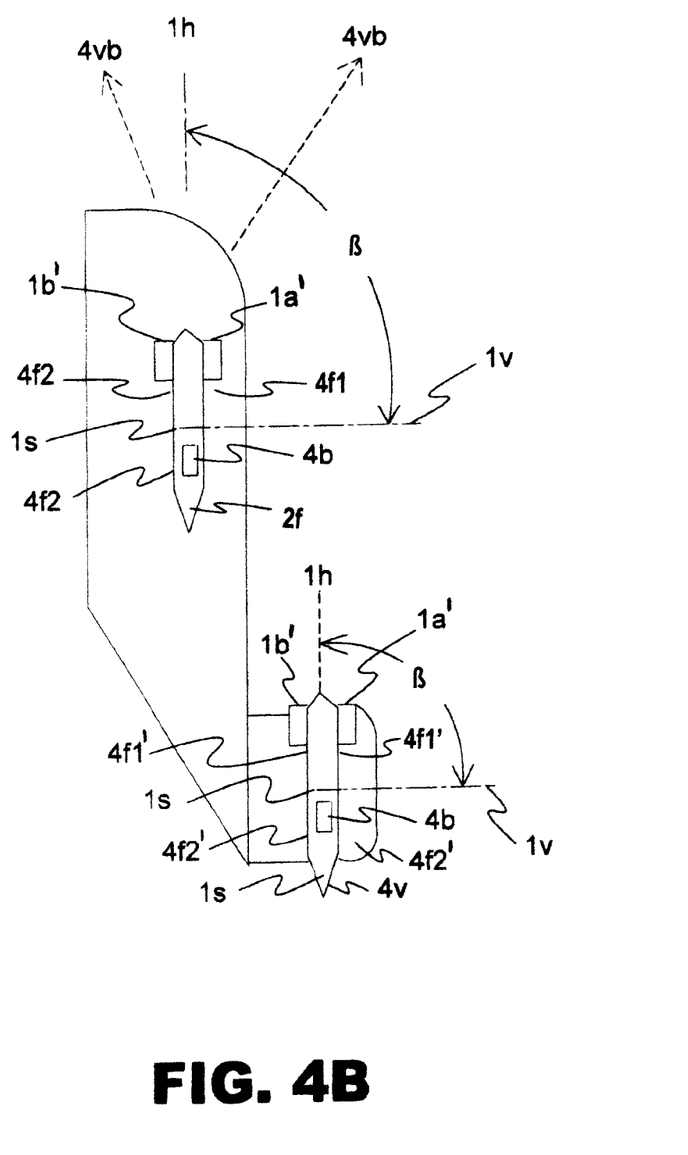
FIG. 4B is a left side view of the Taxicab shown in FIG. 4A.
Figure 4C:
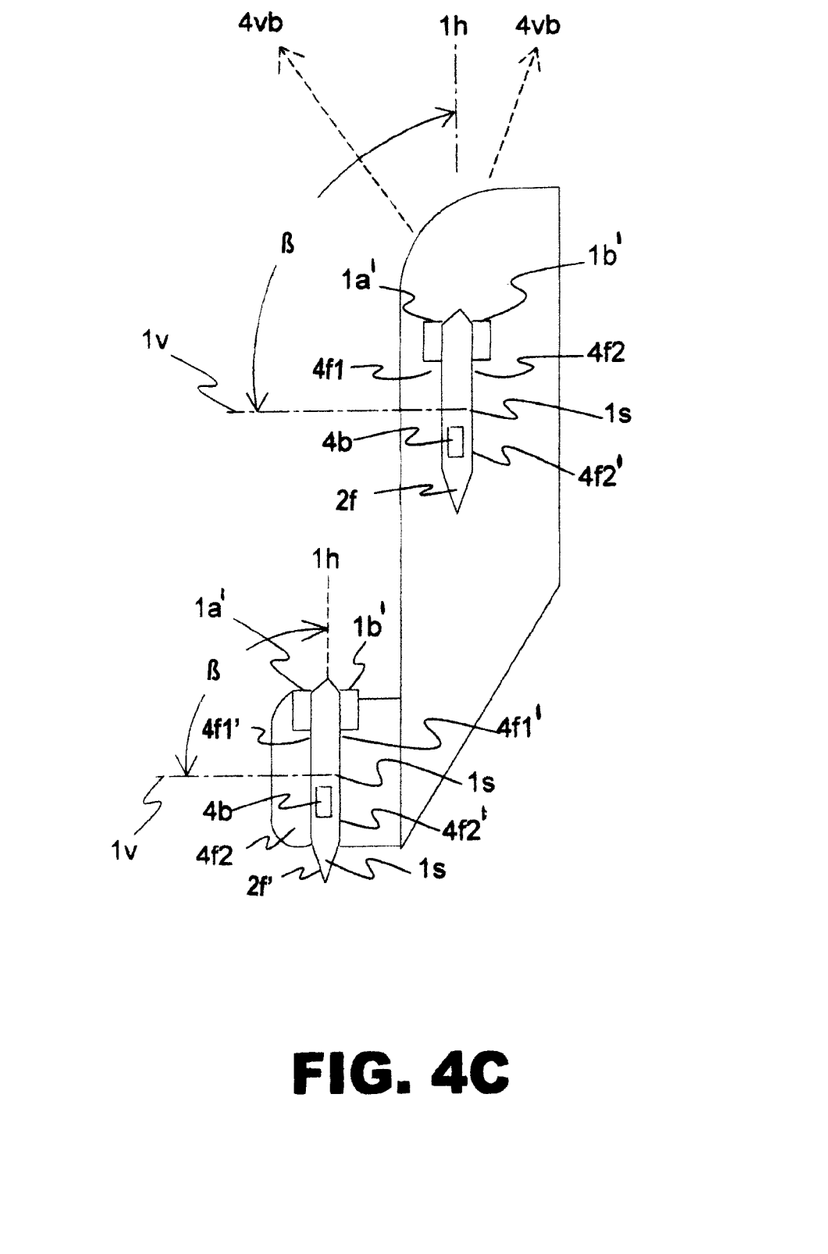
FIG. 4C is a right side view of the Taxicab shown in FIG. 4A.

FIGS. 4A through 4C illustrate pilotless or piloted VTOL flying taxi basic flight control options including VTOL-Flying-Taxicab's wing tilt control's unique hardware locations. FIG. 4A is the top view of a VTOL-Flying-Taxicab with both wing 1$w$ and 1$w$' in level flight positions. FIG. 4B is the left-side-view of FIG. 4A and FIG. 4C is the right-side-view of FIG. 4A. As indicated in FIG. 4A the flight direction arrow is identified as local horizontal 1$h$.

Items labeled 4$f$1 and 4$f$2 are rows of controllable small rectangular surfaces on both top and bottom sides of wing 1$w$ respectively. They are called feathers. For wing 1$w$ rows of feathers 4$f$1 and 4$f$2 are located below their respective rows of ducted-propellers 1$a$ and 1$b$ and on either sides of shaft 1$s$ respectively. Similarly, for wing 1$w$', rows of feathers 4$f$1' and 4$f$2' are below their respective rows of ducted-propellers 1$a$' and 1$b$' and on either sides of shaft 1$s$' respectively. These rows of feathers 4$f$1, 4$f$2, 4$f$1' and 4$f$2' are used to assist multiple independent wing flaps 2$f$ and 2$e$ controls of VTOL-Flying-Taxicab's pitch, roll and yaw maneuvers as described in FIG. 2B. The optional use of multiple rows of feathers may replace multiple sections of wing flaps in some VTOL-Flying-Taxicab models. These feather surfaces can be selectively commanded to tilt up to deflect air velocities 2$v$1 or 2$v$2 away from 1$w$ (FIG. 2B). Similarly, 4$f$1' and 4$f$2' can deflect air from 1$w$'. These control actions can also be used to rotate an unlocked wing to its desired tilt angle position.

Rechargeable battery packages 4$b$ and 4$b$' are located between the wing shafts is or 1$s$' and flaps 2$f$ or 2$f$' on wings $1w$ and $1w'$ respectively. Each row of batteries is separated into smaller packages that can be independently controlled to shift a small distance $d(4b)$ (FIG. 2B) towards/away from their respective shafts $1s$ or $1s'$.

When a nose-up command is issued to the VTOL-Flying-Taxicab in high speed level flight, the VTOL-Flying-Taxicab can fly straight up vertically in the $1v$ direction without making any wing tilt change.

Optionally, short-fins may be installed along wing chords to prevent air cross-flows. These short-fins are not shown in any figures to avoid clutters. Specially placed feathers may be used to adjust ducted-propellers' thrust vector directions.

Figures 5A, 5B:
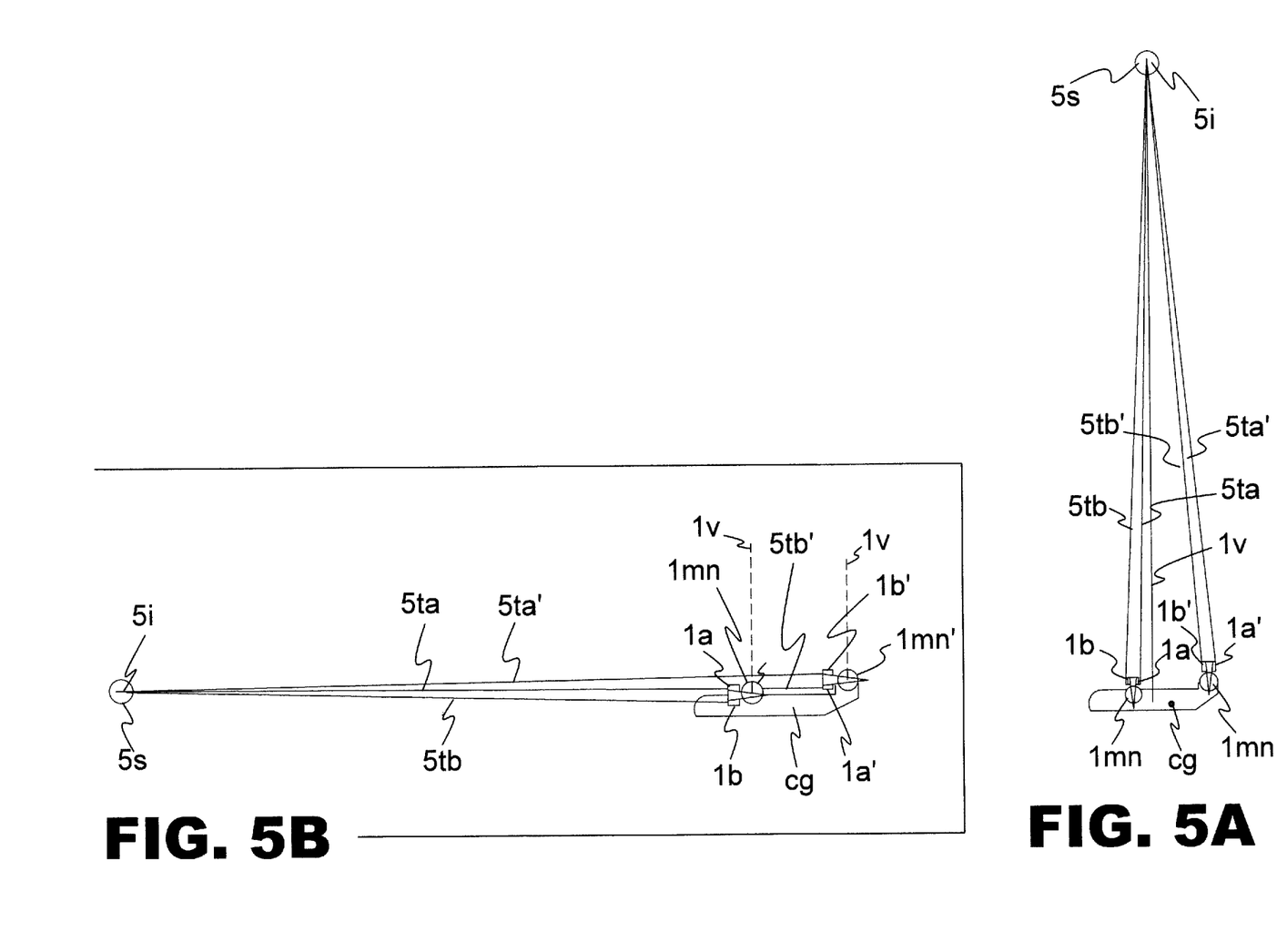
FIG. 5A is a side-view during hover illustrating all ducted propeller thrust vectors intercepting high above the Taxicab's center of gravity.
FIG. 5B is a side-view during level flight illustrating all ducted propeller thrust vectors intercepting high above the Taxicab's center of gravity; and, FIG. 6 illustrates a side view of the Taxicab rescue craft in anchored-level-flight position to rescue people in a high rise building window.

FIGS. 5A and 5B illustrate intersection of all ducted propellers in row $1a$ and all ducted propellers in row $1b$. Illustrated is an ideal condition, where the extension lines of all ducted-propellers' thrust vectors intercept at points inside an ideal small sphere high-above (or far-in-front of) the VTOL-Flying-Taxicab's center of gravity point during hover (or during forward level) flights. FIG. 5A is a side-view during hover and FIG. 5B is a side-view during level-flight, $5ta$ represents the line extension of all thrust vectors $2ti$ lines from all ducted-propellers in row $1a$. $5tb$ represents the line extension of all thrust vectors $2ti$ lines from all ducted-propellers in row $1b$. $5ta'$ represents the line extension of all thrust vectors $2ti'$ lines from all ducted-propellers in row $1a'$. $5tb'$ represents the line extension of all thrust vectors $2ti'$ lines from all ducted-propellers in row $1b'$. $5i$ is the ideal center of the idea small sphere $5s$, where all thrust vectors intercept inside this sphere. When both wings are simultaneously tilted vertically up, $5i$ will be high above the VTOL-Flying-Taxicab's center of gravity point. When both wings are simultaneously tilted close to horizontal position for level forward flights, this $5i$ point will be far in front the VTOL-Flying-Taxicab's center of gravity point.

In order to have all thrust vectors line-extensions to meet inside an ideal small sphere $5s$, it will require each ducted-propeller be installed slightly tilted on its wing. This small sphere is introduced to account for wing load deflections, vibrations, wind gusts, etc.

Figure 6:
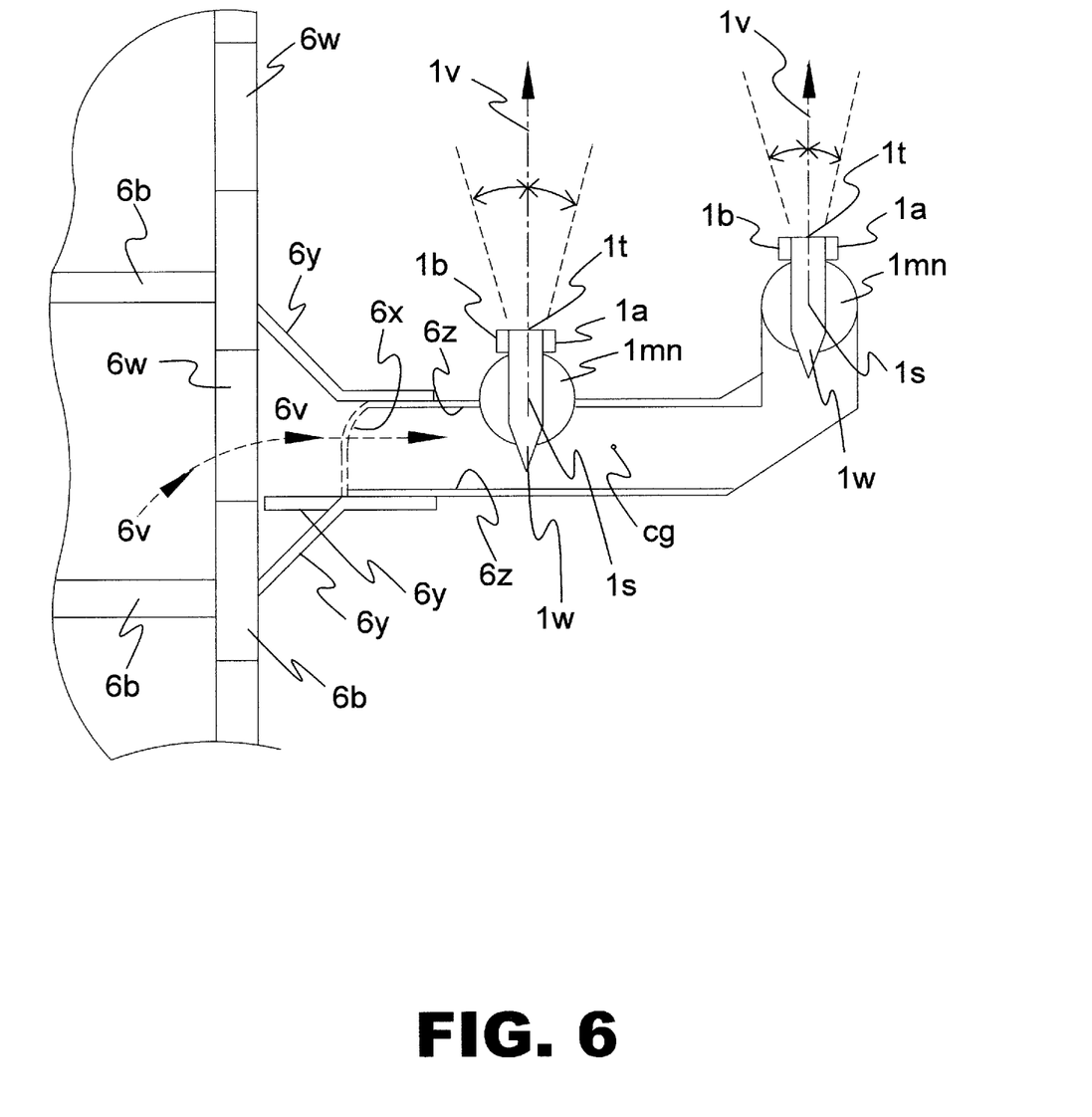

FIG. 6 is an illustrated side-view of a VTOL-Rescue-Craft in anchored-level-flight position to rescue people in a high rise building window. This is done by simply attaching few supporting structure to the front-end of a VTOL-Flying-Taxicab. The anchored-level-flight and the added supporting structures $6y$ are described in Reference 1, $6b$ is the high-rise building wall and floor. $6w$ is the window opening and $6v$ is the pathway where the rescued people move from the building to the VTOL-Rescue-Craft.

While only several embodiments of the present invention have been shown and described, it will be obvious to those skilled in the art that many modifications may be made to the present invention without departing from the spirit and scope thereof.

What is claimed is:

1. A vertical take-off and landing (VTOL) flying taxicab, comprising:
    a fuselage with a pair of wings, wherein a first wing transversely extending left and right from a fuselage body and a second wing transversely extending left and right from a fuselage tail section, wherein each of said first wing and said second wing having a plurality of rows of electrically-powered ducted propellers on a top surface and a bottom surface of each of said first wing and said second wing;
    a plurality of independently controllable sections of wing flaps with said fuselage; and,
    a plurality of feathers having independently controllable surface segments positioned on said top surface and said bottom surface of each of said first wing and said second wing and on each side of a tilt shaft of each of said first wing and said second wing.

2. A vertical take-off and landing (VTOL) flying taxicab, comprising:
    a fuselage with a pair of wings, wherein a first wing transversely extending left and right from a fuselage body and a second wing transversely extending left and right from a fuselage tail section, wherein each of said first wing and said second wing having a plurality of rows of electrically-powered ducted propellers on a top surface and a bottom surface of each of said first wing and said second wing; and,
    a plurality of feathers having independently controllable surface segments positioned on said top surface and said bottom surface of each of said first wing and said second wing and on each side of a tilt shaft of each of said first wing and said second wing.

3. The vertical take-off and landing (VTOL) flying taxicab according to claim 1, wherein said feathers are used to fine-tune aerodynamic force on each of said first wing and said second wind by redirecting a portion of ducted-propellers thrust vectors acting on the first wing or the second wing to assist tilting the first wing or the second wing to a desired angle and to maintain said VTOL flying taxicab's pitch, roll and yaw controls required during any flight.

* * * * *